US011899386B2

(12) United States Patent
Saito

(10) Patent No.: US 11,899,386 B2
(45) Date of Patent: Feb. 13, 2024

(54) FIXING DEVICE WITH MULTIPLE HEATERS, IMAGE FORMING APPARATUS, AND IMAGE FORMING METHOD

(71) Applicant: Kazuya Saito, Kanagawa (JP)

(72) Inventor: Kazuya Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/588,351

(22) Filed: Jan. 31, 2022

(65) Prior Publication Data

US 2022/0291614 A1 Sep. 15, 2022

(30) Foreign Application Priority Data

Mar. 12, 2021 (JP) ................................ 2021-040538

(51) Int. Cl.
*G03G 15/20* (2006.01)
*G03G 15/00* (2006.01)

(52) U.S. Cl.
CPC ....... *G03G 15/2053* (2013.01); *G03G 15/205* (2013.01); *G03G 15/2064* (2013.01); *G03G 15/5004* (2013.01); *G03G 15/5045* (2013.01); *G03G 2215/2038* (2013.01)

(58) Field of Classification Search
CPC ....................... G03G 15/2053; G03G 15/2042
See application file for complete search history.

(56) References Cited

U.S. PATENT DOCUMENTS

| | | | | |
|---|---|---|---|---|
| 8,155,541 B2 * | 4/2012 | Iwamoto | G03G 15/2039 399/33 |
| 8,918,042 B2 * | 12/2014 | Imada | G03G 15/2042 399/329 |
| 9,599,940 B2 * | 3/2017 | Yamano | G03G 15/2053 |
| 10,078,300 B2 * | 9/2018 | Samei | G03G 15/2039 |
| 11,662,678 B2 * | 5/2023 | Matsuda | G03G 15/2053 399/69 |
| 2017/0010571 A1 * | 1/2017 | Matsuda | G03G 15/2053 |
| 2017/0248885 A1 | 8/2017 | Saito et al. | |

(Continued)

FOREIGN PATENT DOCUMENTS

| | | |
|---|---|---|
| EP | 3709095 A1 * | 9/2020 |
| JP | 2011-242686 | 12/2011 |

(Continued)

*Primary Examiner* — Arlene Heredia
(74) *Attorney, Agent, or Firm* — XSENSUS LLP

(57) ABSTRACT

A fixing device includes an endless fixing rotator, a temperature detector, a pressure rotator, a nip formation pad, and a plurality of heaters. The temperature detector detects a temperature of the fixing rotator. The pressure rotator is in contact with an outer circumferential surface of the fixing rotator. The nip formation pad is disposed inside a loop of the fixing rotator to form a nip between the fixing rotator and the pressure rotator. The plurality of heaters heat an inner circumferential surface of the fixing rotator and includes a first heater and a second heater. The first heater uniformly generates heat in a longitudinal direction of the fixing rotator and independently receives power. The second heater generates different heat generation amounts at different positions in the longitudinal direction of the fixing rotator and receives power together with the first heater.

7 Claims, 5 Drawing Sheets

(56) References Cited

U.S. PATENT DOCUMENTS

| | | | | |
|---|---|---|---|---|
| 2022/0043377 | A1* | 2/2022 | Endo .................. | G03G 15/2042 |
| 2022/0100134 | A1* | 3/2022 | Miyamoto ......... | G03G 15/2064 |

FOREIGN PATENT DOCUMENTS

| | | |
|---|---|---|
| JP | 2017-021325 | 1/2017 |
| JP | 2017-116961 | 6/2017 |
| JP | 2017-142541 | 8/2017 |
| JP | 2018-124563 | 8/2018 |

* cited by examiner

FIXING DEVICE WITH MULTIPLE HEATERS, IMAGE FORMING APPARATUS, AND IMAGE FORMING METHOD

CROSS-REFERENCE TO RELATED APPLICATION

This patent application is based on and claims priority pursuant to 35 U.S.C. § 119(a) to Japanese Patent Application No. 2021-040538, filed on Mar. 12, 2021 in the Japan Patent Office, the entire disclosure of which is incorporated by reference herein.

BACKGROUND

Technical Field

Embodiments of the present disclosure generally relate to a fixing device, an image forming apparatus incorporating the fixing device, and an image forming method.

Related Art

The image forming apparatus such as a copier or a printer uses various sizes of sheets as recording media. One type of image forming apparatus incudes a fixing device to fix a toner image formed on a recording medium. The fixing device includes a heater to heat and fix the toner image. The length of the heater of the fixing device corresponds to the maximum size of the recording medium. A controller of the image forming apparatus controls the heater so that the temperature of the fixing member is within a predetermined range.

SUMMARY

This specification describes an improved fixing device that includes an endless fixing rotator, a temperature detector, a pressure rotator, a nip formation pad, and a plurality of heaters. The temperature detector detects a temperature of the fixing rotator. The pressure rotator is in contact with an outer circumferential surface of the fixing rotator. The nip formation pad is disposed inside a loop of the fixing rotator to form a nip between the fixing rotator and the pressure rotator. The plurality of heaters heat an inner circumferential surface of the fixing rotator and includes a first heater and a second heater. The first heater uniformly generates heat in a longitudinal direction of the fixing rotator and independently receives power. The second heater generates different heat generation amounts at different positions in the longitudinal direction of the fixing rotator and receives power together with the first heater.

This specification further describes an improved image forming method that includes forming a toner image on a recording medium and fixing the toner image onto the recording medium using a fixing rotator heated. The fixing rotator is heated by one of a first mode and a second mode. In the first mode, only a first heater having a uniform heat generation amount distribution in a longitudinal direction of the fixing rotator heats the fixing rotator. In the second mode, a second heater having different heat generation amounts at different positions in the longitudinal direction of the fixing rotator heats the fixing rotator together with the first heater.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
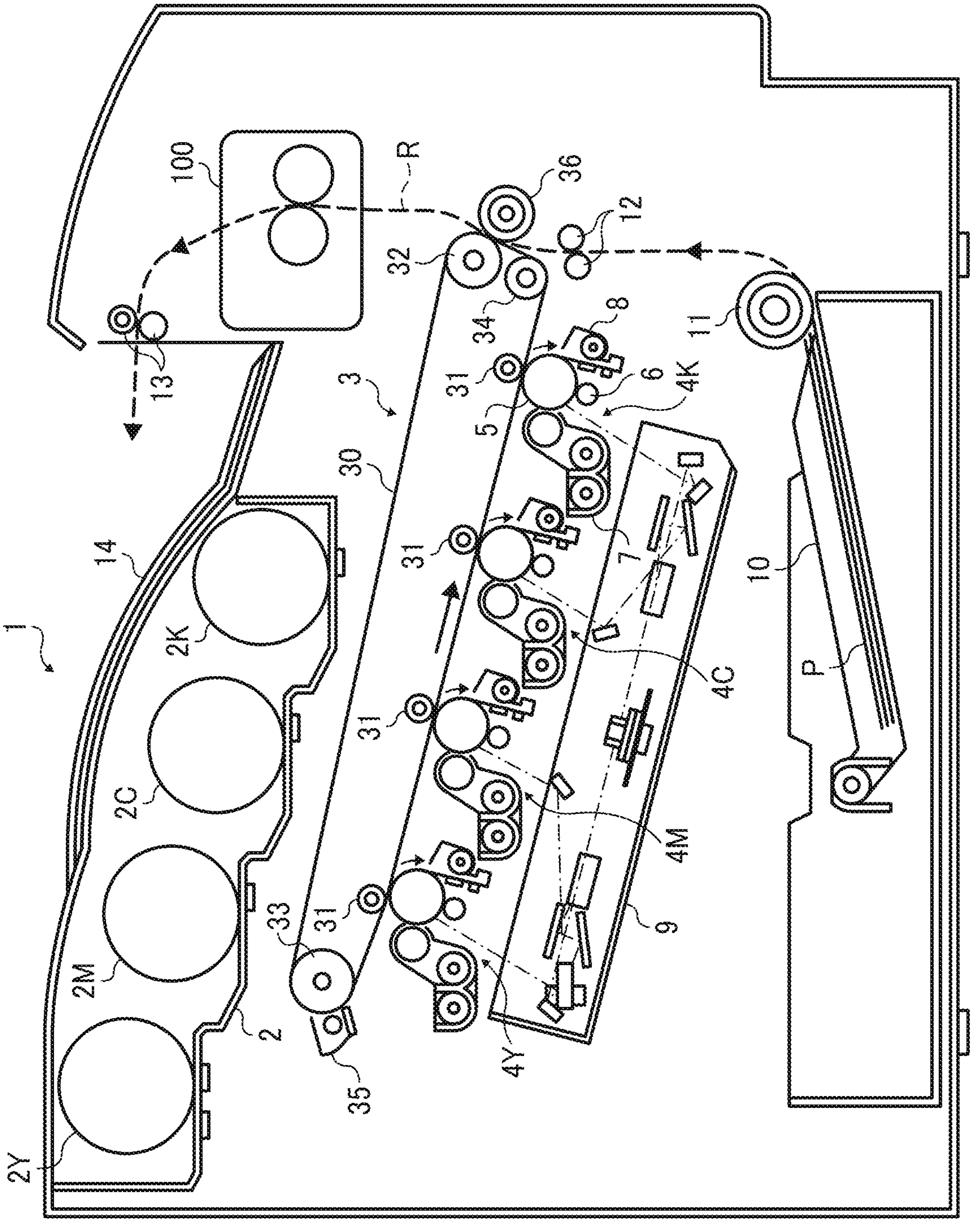
FIG. 1 is a schematic diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail below with reference to the drawings. It is to be noted that the present disclosure is not to be considered limited to the following embodiments but can be changed within the range that can be conceived of by those skilled in the art, such as other embodiments, additions, modifications, deletions, and the scope of the present disclosure encompasses any aspect, as long as the aspect achieves the operation and advantageous effect of the present disclosure. Further, in the drawings, the same reference numerals are given to same components and corresponding parts having the same configurations or functions, and redundant description thereof will be omitted.

Initially with reference to FIG. 1, a description is given of an image forming apparatus 1 including a fixing device according to an embodiment of the present disclosure. FIG. 1 is a schematic diagram illustrating an overall configuration of an image forming apparatus according to an embodiment of the present disclosure.

As illustrated in FIG. 1, the image forming apparatus 1 includes four image forming devices 4Y, 4M, 4C, and 4K disposed at a center portion thereof. The image forming devices 4Y, 4M, 4C, and 4K have substantially the same configuration except for containing different color developers (e.g., toners) of yellow (Y), magenta (M), cyan (C), and black (K), respectively, corresponding to color separation components of color images.

Specifically, each of the image forming devices 4Y, 4M, 4C, and 4K includes, e.g., a drum-shaped photoconductor 5 serving as a latent image bearer, a charger 6 that charges the surface of the photoconductor 5, a developing device 7 that supplies toner to the surface of the photoconductor 5, and a cleaner 8 that cleans the surface of the photoconductor 5. It is to be noted that, in FIG. 1, reference numerals are assigned to the photoconductor 5, the charger 6, the developing device 7, and the cleaner 8 of the image forming device 4K that forms a black toner image, whereas reference numerals for the image forming devices 4Y, 4M, and 4C that form yellow, magenta, and cyan toner images, respectively, are omitted.

An exposure device 9 is disposed below the image forming devices 4Y, 4M, 4C, and 4K and exposes the outer circumferential surfaces of the respective photoconductors 5 with laser beams. The exposure device 9 includes a light source, a polygon mirror, an f-θ lens, and a reflection mirror to irradiate the surface of the photoconductor 5 with the laser beam according to image data.

A transfer device 3 is disposed above the image forming devices 4Y, 4M, 4C, and 4K. The transfer device 3 includes an intermediate transfer belt 30 as an intermediate transfer member, four primary transfer rollers 31 as primary transferor, a secondary transfer roller 36 as a secondary transferor, a secondary transfer backup roller 32, a cleaning backup roller 33, a tension roller 34, and a belt cleaner 35.

The intermediate transfer belt 30 is an endless belt stretched taut across the secondary transfer backup roller 32, the cleaning backup roller 33, and the tension roller 34. In the present embodiment, as a driver drives and rotates the secondary transfer backup roller 32 counterclockwise, the intermediate transfer belt 30 rotates in a direction indicated by arrow in FIG. 1.

The four primary transfer rollers 31 sandwich the intermediate transfer belt 30 together with the four photoconductors 5, forming four primary transfer nips between the intermediate transfer belt 30 and the photoconductors 5, respectively. Each primary transfer roller 31 is connected to a power supply that applies a predetermined direct current (DC) voltage and/or alternating current (AC) voltage to each primary transfer roller 31.

The intermediate transfer belt 30 is interposed between the secondary transfer roller 36 and the secondary transfer backup roller 32 to form a secondary transfer nip. Similar to the primary transfer rollers 31, the secondary transfer roller 36 is connected to the power supply that applies a predetermined direct current (DC) voltage and/or alternating current (AC) voltage to the secondary transfer roller 36.

The belt cleaner 35 includes a cleaning brush and a cleaning blade that contact an outer circumferential surface of the intermediate transfer belt 30. A waste-toner conveyance tube extends from the belt cleaner 35 to an inlet of a waste-toner container to convey waste toner collected from the intermediate transfer belt 30 by the belt cleaner 35 to the waste-toner container.

A bottle holder 2 is disposed in an upper portion of the image forming apparatus 1 and accommodates four toner bottles 2Y, 2M, 2C, and 2K detachably attached to the bottle holder 2. The toner bottles 2Y, 2M, 2C, and 2K contain fresh yellow, cyan, magenta, and black toners to be supplied to the developing devices 7 of the image forming devices 4Y, 4M, 4C, and 4K, respectively. The fresh toner is supplied from the toner bottles 2Y, 2M, 2C, and 2K to the respective developing devices 7 through toner supply tubes connected between the toner bottles 2Y, 2M, 2C, and 2K and the respective developing devices 7.

In a lower portion of the image forming apparatus 1, a sheet feeding tray 10 and a sheet feeding roller 11 are disposed. The sheet feeding tray 10 contains sheets P as recording media. The sheet feeding roller 11 feeds the sheet P from the sheet feeding tray 10. The sheets P as recording media may be plain paper, thick paper, postcards, envelopes, thin paper, coated paper, art paper, tracing paper, overhead projector (OHP) transparencies, and the like. Optionally, the image forming apparatus 1 may include a bypass feeder that imports such recording media placed on a bypass tray into the housing of the image forming apparatus 1.

The image forming apparatus 1 includes a conveyance path R to convey the sheet P from the sheet feeding tray 10 to a sheet ejection roller pair 13 via the secondary transfer nip. The sheet ejection roller pair 13 ejects the sheet P outside the housing of the image forming apparatus 1. On the conveyance path R, a pair of registration rollers 12 as a conveyance device to convey the sheet P to the secondary transfer nip is disposed upstream from the secondary transfer roller 36 in the sheet conveyance direction.

The fixing device 100 is disposed downstream from the secondary transfer roller 36 in the sheet conveyance direction. The fixing device 100 receives the sheet P bearing a toner image and fixes the toner image onto the sheet P. On the conveyance path R downstream from the fixing device 100 in the sheet conveyance direction, a sheet ejection roller pair 13 is disposed to eject the sheet P outside the image forming apparatus 1. To stack the sheet P ejected outside the image forming apparatus 1, an output tray 14 is disposed on a top surface of the image forming apparatus 1.

Figure 2:
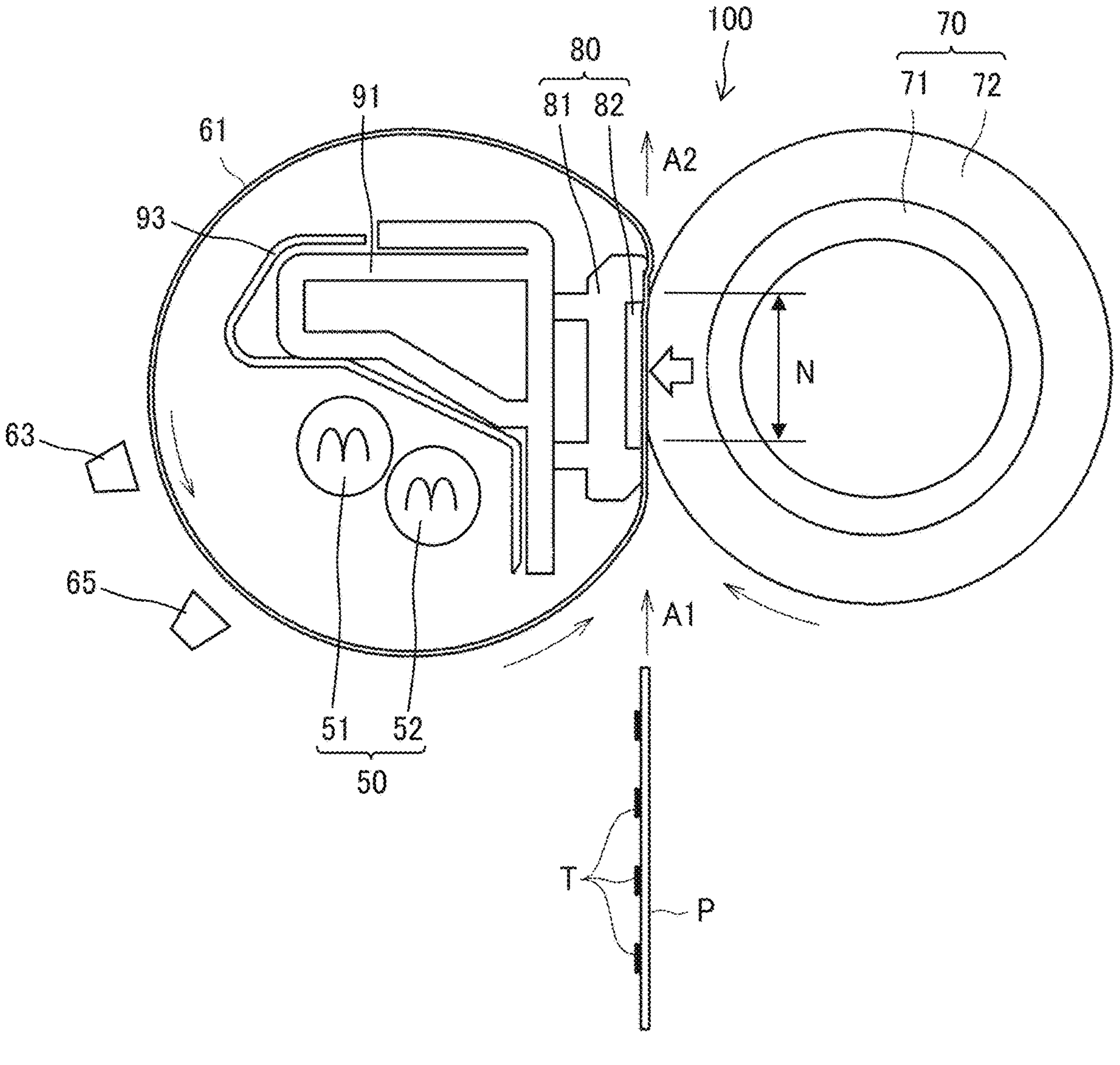
FIG. 2 is a schematic diagram illustrating a configuration of a fixing device installed in the image forming apparatus of FIG. 1.

Next, the fixing device 100 is described with reference to FIG. 2. FIG. 2 is a schematic diagram illustrating a configuration of the fixing device 100 according to the present embodiment of the present disclosure.

The fixing device 100 includes the fixing belt 61 as a fixing rotator, a plurality of heaters 50, a temperature detector 63, an abnormal temperature detector 65, the pressure roller 70 as a pressure rotator, a nip formation pad 80, a support 91, and a reflector 93.

While the sheet P bearing the unfixed transferred toner image T is conveyed from the arrow A1 to the arrow A2 in FIG. 2, the fixing device 100 fixes the toner image onto the sheet P.

The fixing belt 61 is a rotatable endless belt. The fixing belt 61 is constructed of a base layer to form the inner circumferential surface of the fixing belt 61 and a release layer to form the outer circumferential surface of the fixing belt 61. The base layer is made of metal such as nickel or stainless steel (Stainless Used Steel, SUS). Alternatively, the base layer may be made of resin such as polyimide (PI). The release layer is made of tetrafluoroethylene-perfluoroalkylvinylether copolymer (PFA), polytetrafluoroethylene (PTFE), or the like. Optionally, an elastic layer made of rubber such as silicone rubber, silicone rubber foam, and fluoro rubber may be interposed between the base layer and the release layer.

The fixing belt 61 is directly heated by a plurality of heaters 50. Preferably, the fixing belt 61 may have the total thickness not greater than 0.20 mm and more preferably not greater than 0.16 mm.

The fixing belt having the total thickness not greater than 0.2 mm has a low thermal capacity, which improves energy saving.

The plurality of heaters 50 is inside the loop of the fixing belt 61 and directly heat the fixing belt 61. The plurality of heaters 50 may be, for example, halogen heaters. Alternatively, the plurality of heaters 50 may be induction heating (IH) heaters, resistive heat generators, carbon heaters, or the like instead of the halogen heaters.

Both ends of the plurality of heaters 50 are secured to side plates of the fixing device 100. A power supply disposed inside the main body of the image forming apparatus 1 supplies power to the plurality of heaters 50 so that the plurality of heaters 50 generate heat. A controller operatively connected to the plurality of heaters 50 and the temperature detector 63 controls the plurality of heaters 50 based on the temperature of the outer circumferential surface of the fixing belt 61, which is detected by the temperature detector 63. Such heating control of the plurality of heaters 50 adjusts the temperature of the fixing belt 61 to a desired fixing temperature.

The plurality of heaters 50 include a first heater 51 and a second heater 52.

Details of the plurality of heaters 50 is described below with reference to FIGS. 3 and 4.

The temperature detector 63 detects the temperature of the fixing belt 61. The temperature detector 63 is, for example, a temperature sensor.

The abnormal temperature detector 65 is disposed opposite the fixing belt 61 and detects an abnormal temperature rise of the fixing belt 61. The abnormal temperature detector 65 is, for example, a non-contact (NC) sensor.

The pressure roller 70 is a rotator in contact with the outer circumferential surface of the fixing belt 61.

The pressure roller 70 includes a cored bar 71 and an elastic layer 72.

The elastic layer 72 is made of foamed silicone rubber, silicone rubber, fluorine rubber, or the like on the surface of the cored bar 71. A release layer is made of perfluoroalkoxy alkane (PFA), polytetrafluoroethylene (PTFE), or the like on the surface of the elastic layer 72.

The pressurization assembly presses the pressure roller 70 against the nip formation pad 80 via the fixing belt 61. Thus, the pressure roller 70 abuts on the nip formation pad 80 via the fixing belt 61.

The pressure roller 70 in pressure contact with the fixing belt 61 deforms the elastic layer 72 of the pressure roller 70, thus defining a fixing nip N having a specified width, which is a specified length in the sheet conveyance direction, between the fixing belt 61 and the pressure roller 70.

A driver such as a motor disposed inside the main body of the image forming apparatus 1 drives and rotates the pressure roller 70. As the driver drives and rotates the pressure roller 70, a driving force of the driver is transmitted from the pressure roller 22 to the fixing belt 61 at the fixing nip N, thus rotating the fixing belt 61 in accordance with rotation of the pressure roller 22 by friction between the fixing belt 21 and the pressure roller 22.

The nip formation pad 80 is disposed inside the loop of the fixing belt 61 and in contact with the pressure roller 70 via the fixing belt 61 to form the fixing nip N between the fixing belt 61 and the pressure roller 70.

The nip formation pad 80 includes a pad 81 and a thermal equalization plate 82 disposed on the pad 81. The nip formation pad 80 extends in the axial direction of the fixing belt 61 or the pressure roller 70 such that a longitudinal direction of the nip formation pad 24 is parallel to the axial direction of the fixing belt 21 or the pressure roller 22. The nip formation pad 24 is disposed on and supported by the support 91. Accordingly, even if the nip formation pad 80 is pressed by the pressure roller 70, the support 91 prevents the nip formation pad 80 from being bent by the pressure of the pressure roller 70 and therefore allows the nip formation pad 80 to maintain a uniform nip length of the fixing nip N over the entire width of the pressure roller 70 in an axial direction of the pressure roller 70. Preferably, the support 91 is made of metal having an increased mechanical strength, such as stainless steel or iron, to prevent bending of the nip formation pad 80. Alternatively, the support 91 may be made of resin.

The pad 81 is made of a thermal resistant material with thermal-resistant temperature not lower than 200° C. Thus, the pad 81 is immune from thermal deformation at temperatures in a fixing temperature range desirable to fix the toner image on the sheet P, thereby retaining the shape of the fixing nip N and the quality of the toner image formed on the sheet P. For example, the nip formation pad 80 is made of general thermal resistant resin such as polyether sulfone (PES), polyphenylene sulfide (PPS), liquid crystal polymer (LCP), polyether nitrile (PEN), polyamide imide (PAI), and polyether ether ketone (PEEK).

The support 91 supports the nip formation pad 80.

The reflector 93 reflects light radiated from the plurality of heaters 50 toward the fixing belt 61.

The reflector 93 is made of aluminum or stainless steel that can be used as a reflection face. The reflector 93 is interposed between the support 91 and the plurality of heaters 50. In the present embodiment, the reflector 93 is secured to the support 91. Since the reflector 93 is directly heated by the plurality of heaters 50, the reflector 93 is desirably made of, for example, metal having a high-melting point.

The plurality of heaters 50 radiates light toward the support 91, and the reflector 93 disposed as described above reflects the light to the fixing belt 61. Such reflection by the reflector 93 increases an amount of light that irradiates the fixing belt 61, thereby heating the fixing belt 61 efficiently. The reflector 93 also prevents transmission of radiant heat from the plurality of heaters 50 to the support 91 and the like. Thus, energy saving can be achieved.

The image forming apparatus and the fixing device are configured as described above.

Next, the plurality of heaters 50 included in the fixing device 100 are described.

The plurality of heaters 50 include one or more first heater including a heat generation region having a length of the largest sheet in the axial direction of the fixing belt (hereinafter referred to as a largest sheet width). The first heater is configured to be able to independently generate heat.

The fixing device 100 includes, as the plurality of heaters 50, the one or more first heaters 51 configured to heat the entire region of the fixing belt 61 in the longitudinal direction and one or more second heaters 52 having a heat generation distribution in which heat generation amounts are different at positions along the longitudinal direction of the fixing belt 61.

The fixing device 100 is configured such that the first heater 51 can generate heat independently. Additionally, the fixing device 100 is configured such that the first heater 51 and the second heater 52 can generate heat together. A fixing process of the fixing device 100 in which the first heater 51 generates heat alone is referred to as a first operating mode, and a fixing process in which the first heater 51 and the second heater 52 generate heat together is referred to as a second operating mode. In the first operating mode, a fixing process that emphasizes image stability is executed, and in the second operating mode, a fixing process that emphasizes productivity is executed.

The above-described configuration reduces a temperature variation within the recording medium surface caused by variation in the heaters and improves a temperature stability.

As a result, variations in image quality such as glossiness and image density can be reduced. Additionally, in a recent fixing device having a high energy saving performance, that is, having a low thermal capacity, the above-described configuration improves a function of reducing a temperature unevenness in the axial direction and solves a disadvantage in the fixing device having a temperature distribution that is directly given by a heat generation distribution of heaters.

The first heater 51 may have substantially uniform heat generation distribution heating over the entire region of the fixing belt 61 in the longitudinal direction of the fixing belt 61.

The second heater 52 may have different heat generation amount regions along the longitudinal direction of the fixing belt 61, for example, large heat generation region, small heat generation region, and non-heat generation region.

A power supply is disposed in the image forming apparatus 1 and supplies power to the first heater 51 and second heater 52 to generate heat. A controller is disposed in the image forming apparatus 1 to control parts including the power supply in the image forming apparatus 1. The fixing device 100 includes electrodes connected to the first heater 51 so that the first heater 51 can independently generate heat. In addition, the fixing device 100 includes electrodes connected to the second heater 52. These electrodes are connected to the power supply. The controller controls the power supply so that the power supply supplies power to both the first heater 51 and the second heater 52 or supplies power to the first heater 51 alone and does not supply power to the second heater 52. Accordingly, the image forming apparatus 1 including the fixing device 100 according to the embodiment of the present disclosure executes the first operating mode in which the first heater 51 heats the fixing belt 61 alone or the second operating mode in which the first heater 51 and the second heater 52 heat the fixing belt 61 as the heating process of the fixing member.

FIGS. 3A to 3D are schematic diagrams illustrating configurations of the plurality of heaters included in the fixing device according to the embodiments of the present disclosure and comparative embodiments.

In FIGS. 3A to 3D, the vertical axis represents the heat generation amount of the heater, the horizontal axis represents the position in the longitudinal direction of the heater. The plurality of heaters 50 are two halogen heaters that are the first heater 51 and the second heater 52.

Figure 3A:
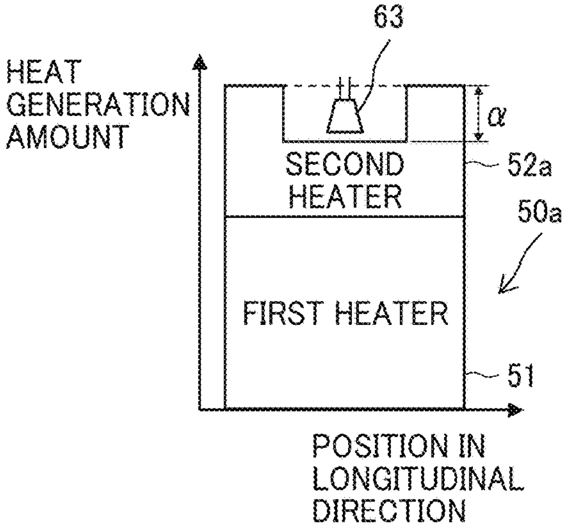
FIG. 3A is a schematic diagram illustrating a configuration of a plurality of heaters in the fixing device according to a first embodiment of the present disclosure.
Figure 3B:
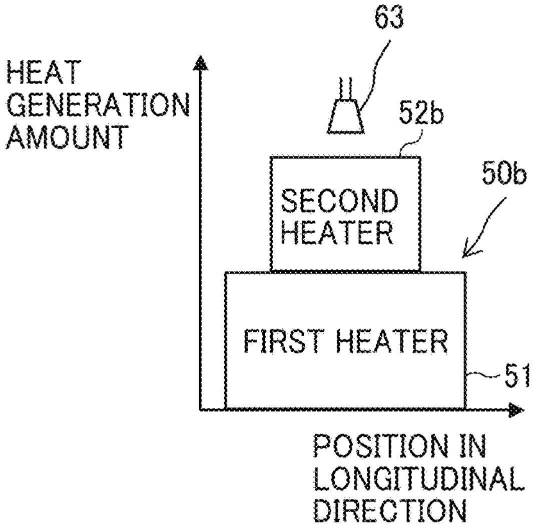
FIG. 3B is a schematic diagram illustrating a configuration of the plurality of heaters in the fixing device according to a second embodiment of the present disclosure.
Figure 3C:
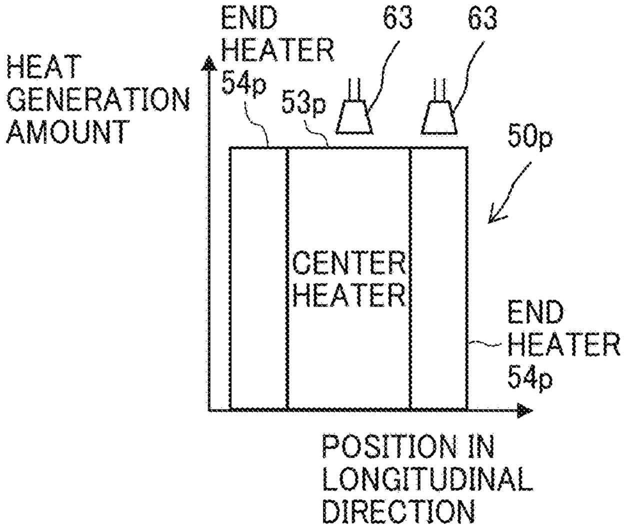
FIG. 3C is a schematic diagram illustrating a configuration of the plurality of heaters in the fixing device according to a first comparative embodiment.
Figure 3D:
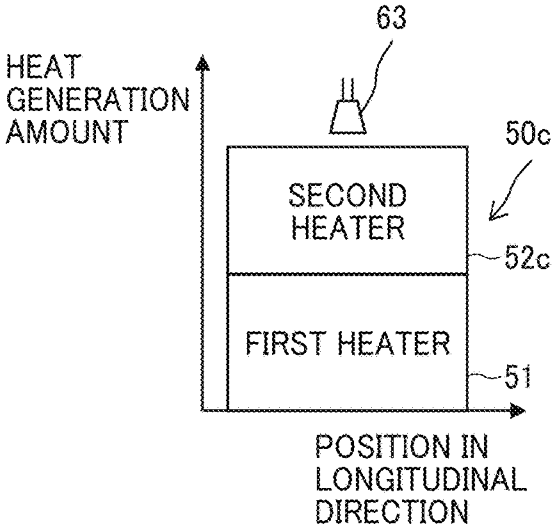
FIG. 3D is a schematic diagram illustrating a configuration of the plurality of heaters in the fixing device according to a second comparative embodiment.

FIG. 3A illustrates a first embodiment, FIG. 3B illustrates a second embodiment, FIG. 3C illustrates a first comparative embodiment, and FIG. 3D illustrates a second comparative embodiment.

In the first embodiment, one of the two halogen heaters has a larger heat generation amount in an end portion of the heater than a center portion of the heater. The plurality of heaters 50*a* includes the first heater 51 having a substantially uniform heat generation amount distribution over the entire region of the first heater 51 in the longitudinal direction and the second heater 52*a* having larger heat generation amounts in both end portions of the second heater 52 than the center portion of the second heater 52 by the difference a.

In the first embodiment, using both heaters solves a low temperature problem at both end portions of the fixing belt immediately after the power is supplied to the fixing device (caused by uneven temperature rise between the center portion and both end portions).

The fixing device according to the second embodiment maximizes productivity of printing small sheets. The plurality of heaters 50*b* includes the first heater 51 having a substantially uniform heat generation amount distribution over the entire region of the first heater 51 in the longitudinal direction and the second heater 52*b* generating heat at the center portion of the second heater 52*b* and not generating heat at both end portions of the second heater 52*b*. In the second embodiment, the second heater 52*b* is used to print small sheets having widths smaller than or equal to a heat generation width of the second heater 52*b*, which prevents temperature rise in the end portion of the fixing belt.

The above-described center portion is the center portion of the second heater 52*b* that heats the center portion of the fixing belt 61 in the longitudinal direction of the fixing belt 61 (that is the axial direction of the pressure roller 70), and both end portions are both end portions of the second heater 52*b* that heats both end portions of the fixing belt 61 in the longitudinal direction of the fixing belt 61. the center portion does not overlap each of both end portions.

The plurality of heaters 50*p* according to the first comparative embodiment are configured by a center heater 50*p* and an end heater 54*p*. When a small sheet passes through the fixing device, the center heater 53*p* generates heat, and the end heater 54*p* does not generate heat. When a large sheet passes through the fixing device, both the center heater 53*p* and the end heater 54*p* generate heat. In the first comparative embodiment, variation in the heaters causes uneven temperature distribution on the large sheet, which causes variations in image density, glossiness, and the like.

The plurality of heaters 50*c* according to the second comparative embodiment are configured by two heaters each having a heat generation region covering the largest sheet width. The plurality of heaters 50*c* includes the second heater 52*c* having the substantially uniform heat generation amount distribution over the entire region of the second heater 52*c* in the longitudinal direction, which is the same configuration of the first heater 51. The above-described configuration fixes the problem caused by the variation in the heaters and improves the temperature stability on the recording medium but is difficult to heat sheets having various sizes compared with the configurations in the first and second embodiments.

As described above, the fixing device 100 according to the present exemplary embodiment includes at least one first heater that uniformly heats the entire width of the largest sheet as the largest recording medium and at least one second heater having a different heat generation distribution from that of the first heater so as to reduce the temperature unevenness in the recording medium surface caused by the sizes of the recording media. In the fixing device 100, selecting the first heater and the second heater based on the size of the recording medium reduces the temperature variation caused by variation in heaters.

Figure 4A:
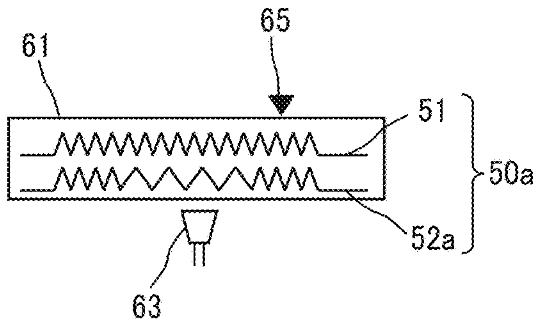
FIG. 4A is a schematic diagrams illustrating an arrangement of the plurality of heaters, a temperature detector, and an abnormal temperature detector in the fixing device of FIG. 3A.
Figure 4B:
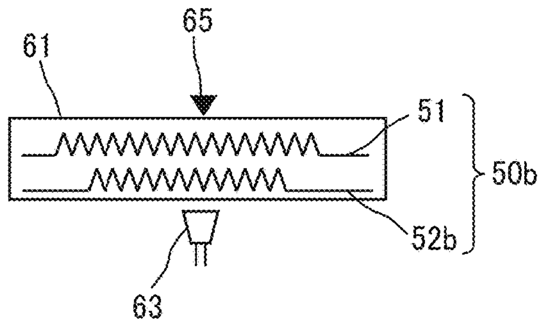
FIG. 4B is a schematic diagrams illustrating an arrangement of the plurality of heaters, the temperature detector, and the abnormal temperature detector in the fixing device of FIG. 3B.
Figure 4C:
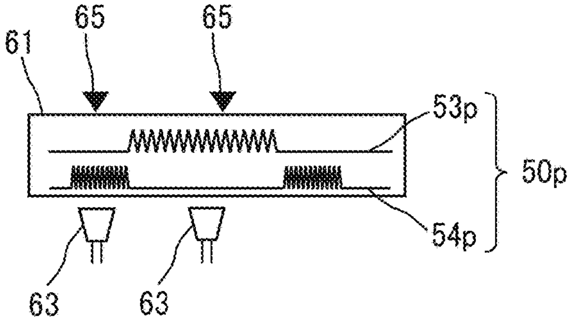
FIG. 4C is a schematic diagrams illustrating an arrangement of the plurality of heaters, the temperature detector, and the abnormal temperature detector in the fixing device of FIG. 3C.
Figure 4D:
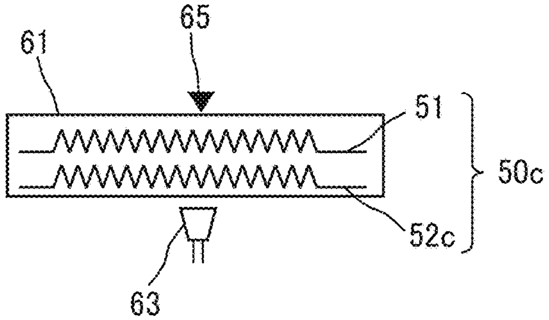
FIG. 4D is a schematic diagrams illustrating an arrangement of the plurality of heaters, the temperature detector, and the abnormal temperature detector in the fixing device of FIG. 3D.

Each of FIGS. 4A to 4D is a schematic diagram illustrating an arrangement of the plurality of heaters, the temperature detector, and the abnormal temperature detector in each of the fixing devices of FIGS. 3A to 3D, respectively. FIG. 4A illustrates the first embodiment including the plurality of heaters illustrated in FIG. 3A, FIG. 4B illustrates the second embodiment including the plurality of heaters illustrated in FIG. 3B, FIG. 4C illustrates the first comparative embodiment including the plurality of heaters illustrated in FIG. 3C, and FIG. 4D illustrates the second comparative embodiment including the plurality of heaters illustrated in FIG. 3D.

As illustrated in FIG. 4C, the fixing device according to the first comparative embodiment includes at least two temperature detectors 63 and at least two abnormal temperature detectors 65. One temperature detector 63 faces the center heater 53*p*, and the other temperature detector 63 faces the end heater 54*p*. Similarly, on abnormal temperature detector 65 faces the center heater 53*p*, and the other abnormal temperature detector 65 faces the end heater 54*p*.

In contrast, as illustrated in FIGS. 4A, 4B, and 4D, the fixing devices according to the first and second embodiments and the second comparative embodiment includes one temperature detector 63 and one abnormal temperature detector 65 that are disposed at a position facing both the first heater and the second heater, which reduces the number of sensors.

The fixing device 100 including the plurality of heaters 50 is preferably configured as follows.

In the fixing device 100, the abnormal temperature detector 65 is preferably disposed at a position corresponding to a position of the plurality of heaters at which the plurality of heaters generate a larger heat amount than another position of the plurality of heaters (for example, see FIGS. 4A and 4B).

The above-described configuration can ensure safety in the plurality of heaters including the heater having different heat generation amounts in the axial direction.

In the fixing device 100, a total heat generation amount generated by both end portions of the first heater 51 and the second heater 52 may be larger than a total heat generation amount generated by the center portion of the first heater 51 and the center portion of the second heater 52 by 5% to 15% in a total heat generation amount ratio under the rated voltage. The heat generation amount generated by each portion of the heater is adjusted, for example, by changing the filament density in the heater as illustrated in FIG. 4A.

The above-described configuration can prevent a fixing failure caused by a temperature drop at an end portion of the fixing belt that occurs when heat dissipation at the end portion of the fixing device is large, such as immediately after the cooled fixing device is turned on.

In the fixing device 100, the amount of heat generated at the center portion of the second heater 52 may be smaller than the amount of heat generated at the center portion of the first heater 51.

The above-described configuration can increase the amount of heat generated by the first heater 51 as much as possible when the second heater 52 is used as an auxiliary heat source only immediately after the cooled fixing device is turned on. This is effective, for example, when the total power of the image forming apparatus is limited (1500 W or the like).

Figure 5:
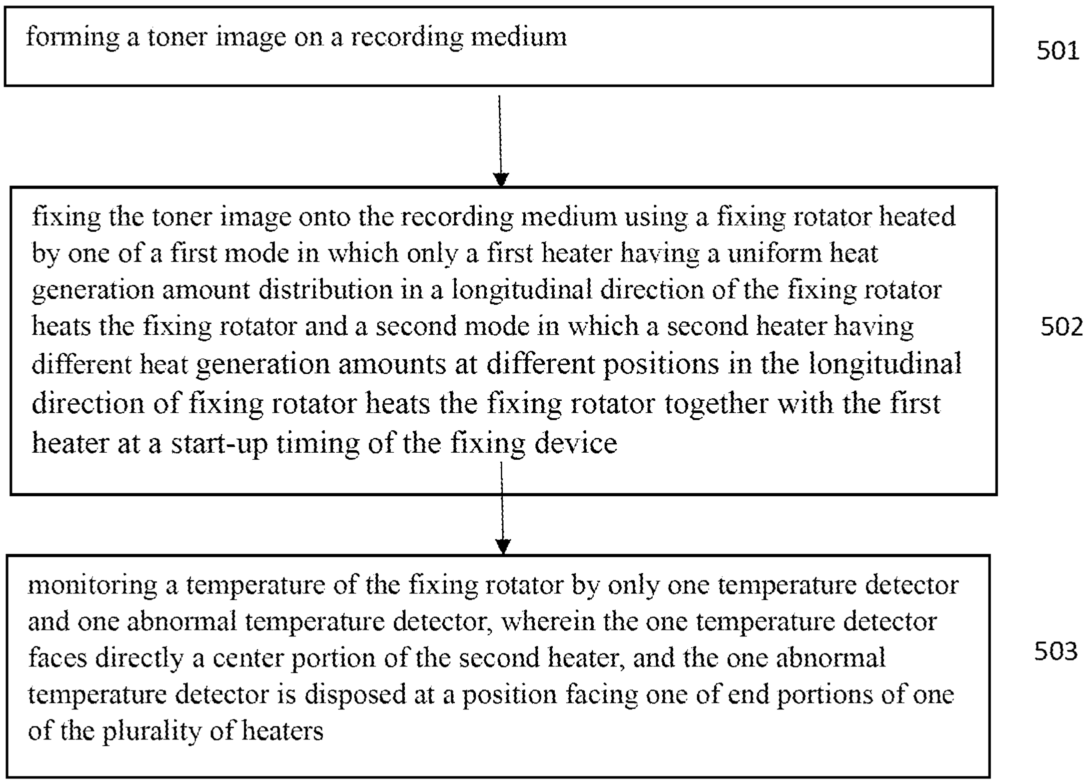
FIG. 5 is a flow chart of an image forming method according to one embodiment of the present disclosure.

In addition, as shown in FIG. 5, the fixing device 100 may drive both the first heater 51 and the second heater 52 at least at a start-up timing of the fixing device 100. Actually, the controller in the image forming apparatus 1 determines whether or not the fixing device is at the start-up timing based on the temperature detected by the temperature detector 63. For example, if the detected temperature is equal to or lower than a predetermined temperature (for example, equal to or lower than a half of a target fixing temperature), the controller determines that the fixing device is at the started-up timing. At the start-up timing, the controller controls the power supply to supply power to both the first heater 51 and the second heater 52, that is, executes the second mode.

The above-described configuration can shorten a time required to start using the fixing device after the fixing device is turned on and prevent the fixing failure caused by the temperature drop at the end portion of the fixing belt that occurs when heat dissipation at the end portion of the fixing device is large, such as immediately after the cooled fixing device is turned on.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A fixing device comprising:

a fixing rotator having an endless form;

a temperature detector to detect a temperature of the fixing rotator;

a pressure rotator in contact with an outer circumferential surface of the fixing rotator;

a nip formation pad disposed inside a loop of the fixing rotator to form a nip between the fixing rotator and the pressure rotator; and a plurality of heaters to heat an inner circumferential surface of the fixing rotator, the plurality of heaters including:

a first heater to uniformly generate heat in a longitudinal direction of the fixing rotator and independently receive power;

a second heater to generate different heat amounts at different positions in the longitudinal direction of the fixing rotator and receive power together with the first heater, the second heater generating larger heat amounts in each of end portions of the second heater than a center portion of the second heater; and a reflector between the nip formation pad and the plurality of heaters, wherein an amount of heat generated at a center portion of the second heater is smaller than an amount of heat generated at a center portion of the first heater, the fixing rotator has a thickness equal to or smaller than 0.2 mm, the reflector reflects the heat generated by the plurality of heaters to heat the inner circumferential surface of the fixing rotator at a place other than the nip, the fixing device includes only one temperature detector and one abnormal temperature detector, the one temperature detector faces directly the center portion of the second heater, and the one abnormal temperature detector is disposed at a position facing one of the end portions of the second heater at which the plurality of heaters generate a total heat generation amount larger than at another position, and total heat amount generated by both end portions of the first heater and the both end portions of the second heater is larger than total heat amount generated by the center portion of the first heater and the center portion of the second heater by 5% to 15% in a total heat amount ratio under a rated voltage.

2. The fixing device according to claim 1, wherein the abnormal temperature detector detects abnormal temperature rise of the fixing rotator.

3. The fixing device according to claim 1, wherein a total heat generation amount generated by both end portions of the first heater and both end portions of the second heater is larger than a total heat generation amount generated by a center portion of the first heater and a center portion of the second heater by 5% to 15% in a total heat generation amount ratio under a rated voltage.

4. An image forming apparatus comprising the fixing device according to claim 1.

5. The image forming apparatus according to claim 4, further comprising:

a power supply to supply power to the first heater and the second heater; and a controller configured to control the power supply to drive the fixing device so as to perform one of a first mode in which the first heater alone generates heat and a second mode in which the first heater and the second heater generate heat together.

6. The image forming apparatus according to claim 5, wherein the controller is configured to drive the fixing device to perform the second mode at a start-up timing of the fixing device.

7. An image forming method comprising:

forming a toner image on a recording medium;

fixing the toner image onto the recording medium using a fixing rotator heated by one of a first mode in which only a first heater having a uniform heat generation amount distribution in a longitudinal direction of the fixing rotator heats the fixing rotator and a second mode in which a second heater having different heat generation amounts at different positions in the longitudinal direction of fixing rotator heats the fixing rotator together with the first heater, the second heater generating larger heat amounts in each of end portions of the second heater than a center portion of the second heater, and monitoring a temperature of the fixing rotator by only one temperature detector and one abnormal temperature detector, wherein the one temperature detector faces directly a center portion of the second heater, and the one abnormal temperature detector is disposed at a position facing one of the end portions of the second heater at which the plurality of heaters generate a total heat generation amount larger than at another position, wherein an amount of heat generated at the center portion of the second heater is smaller than an amount of heat generated at a center portion of the first heater, and the fixing rotator has a thickness equal to or smaller than 0.2 mm, the heat generated by the first heater and/or the second heater is reflected by a reflector to heat an inner circumferential surface of the fixing rotator at a place other than a nip between the fixing rotator and a pressure rotator, and total heat amount generated by both end portions of the first heater and the both end portions of the second heater is larger than total heat amount generated by the center portion of the first heater and the center portion of the second heater by 5% to 15% in a total heat amount ratio under a rated voltage.

* * * * *